United States Patent
Cheng et al.

(10) Patent No.: US 12,260,112 B2
(45) Date of Patent: Mar. 25, 2025

(54) METHOD AND APPARATUS FOR ACCESSING SOLID STATE DISK

(71) Applicant: HUAWEI TECHNOLOGIES CO., LTD., Shenzhen (CN)

(72) Inventors: Tao Cheng, Shenzhen (CN); Yi He, Chengdu (CN); Li Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/730,798

(22) Filed: Apr. 27, 2022

(65) Prior Publication Data
US 2022/0253238 A1    Aug. 11, 2022

Related U.S. Application Data

(63) Continuation of application No. PCT/CN2020/119841, filed on Oct. 7, 2020.

(30) Foreign Application Priority Data
Oct. 28, 2019    (CN) .......................... 201911031211.0

(51) Int. Cl.
*G06F 12/00*    (2006.01)
*G06F 3/06*    (2006.01)

(52) U.S. Cl.
CPC .......... *G06F 3/0655* (2013.01); *G06F 3/0611* (2013.01); *G06F 3/0679* (2013.01)

(58) Field of Classification Search
CPC .... G06F 3/0655; G06F 3/0611; G06F 3/0679; G06F 3/0656; G06F 3/0659; G06F 3/067; G06F 3/061
See application file for complete search history.

(56) References Cited

U.S. PATENT DOCUMENTS

| | | | |
|---|---|---|---|
| 6,246,682 B1 * | 6/2001 | Roy | H04L 12/5601 370/395.72 |
| 6,831,916 B1 * | 12/2004 | Parthasarathy | H04L 12/66 370/359 |
| 7,353,301 B2 * | 4/2008 | Radhakrishnan | G06F 13/1631 710/33 |
| 10,761,752 B1 * | 9/2020 | Narayanan | G06F 3/0644 |
| 2011/0213854 A1 | 9/2011 | Haviv | |

(Continued)

FOREIGN PATENT DOCUMENTS

| | | |
|---|---|---|
| CN | 106210041 A | 12/2016 |
| CN | 107003943 A | 8/2017 |

(Continued)

*Primary Examiner* — Shawn X Gu
*Assistant Examiner* — Mohammad S Hasan
(74) *Attorney, Agent, or Firm* — Rimon PC

(57) ABSTRACT

This disclosure provides a method and an apparatus for accessing a solid state disk (SSD). The method is applied to a storage node, the storage node includes a network interface card and an SSD, and the network interface card includes a memory. The network interface card receives a data write request sent by a client, where the data write request includes to-be-written data. The network interface card writes the to-be-written data to the memory of the network interface card, and the SSD obtains the to-be-written data from the memory of the network interface card and writes the to-be-written data to the SSD.

8 Claims, 5 Drawing Sheets

(56) References Cited

U.S. PATENT DOCUMENTS

| | | | |
|---|---|---|---|
| 2011/0231613 A1* | 9/2011 | Ober | H04L 49/9073 709/217 |
| 2012/0079175 A1* | 3/2012 | Flynn | G06F 3/0679 711/170 |
| 2016/0124880 A1* | 5/2016 | Goren | G06F 3/067 710/263 |
| 2016/0147676 A1 | 5/2016 | Cha et al. | |
| 2017/0149920 A1 | 5/2017 | Sammatshetti | |
| 2018/0253331 A1* | 9/2018 | Sato et al. | |
| 2018/0307596 A1* | 10/2018 | Pandurangan | G06F 3/0652 |
| 2019/0272123 A1 | 9/2019 | Gissin et al. | |
| 2019/0278701 A1* | 9/2019 | Enz | G06F 12/0891 |
| 2019/0310964 A1* | 10/2019 | Zhang | G06F 15/17331 |
| 2020/0210355 A1* | 7/2020 | Danilov | G06F 13/20 |
| 2021/0072907 A1* | 3/2021 | Li | G06F 3/0659 |
| 2021/0200681 A1* | 7/2021 | Gong | H04L 67/1097 |
| 2022/0244861 A1* | 8/2022 | Li | G06F 3/061 |

FOREIGN PATENT DOCUMENTS

| | | |
|---|---|---|
| CN | 107145459 A | 9/2017 |
| CN | 108365930 A | 8/2018 |
| CN | 108369530 A | 8/2018 |
| CN | 109117386 A | 1/2019 |
| CN | 109936513 A | 6/2019 |
| IN | 107077426 A | 8/2017 |

* cited by examiner

METHOD AND APPARATUS FOR ACCESSING SOLID STATE DISK

CROSS-REFERENCE TO RELATED APPLICATIONS

This application is a continuation of International Patent Application No. PCT/CN2020/119841 filed on Oct. 7, 2020, which claims priority to Chinese Patent Application No. 201911031211.0 filed on Oct. 28, 2019. The disclosures of the aforementioned applications are hereby incorporated by reference in their entireties.

TECHNICAL FIELD

This disclosure relates to the storage field, and in particular, to a method and an apparatus for accessing a solid state disk.

BACKGROUND

Currently, in most storage scenarios, the disk and the host are not in the same chassis in many cases, but are separated remotely by using a network. In the case where a solid state disk (SSD) is located remotely, a manner for accessing the SSD is as follows: A network interface card (NIC) first writes data to a host, and then the host writes the data to the SSD. Clearly, in one aspect, a central processing unit (CPU) of the host needs to participate in each input/output (I/O) operation, and host memory and memory bandwidth are consumed. In another aspect, because the data is written from the NIC to the host, and then the host writes the data to the SSD, a plurality of parallel peripheral component interconnect express (PCIe) interactions are performed, and consequently, the quantity of PCIe interactions is relatively large, and latency is relatively high.

SUMMARY

This disclosure provides a method and an apparatus for accessing a solid state disk, to reduce the quantity of PCIe interactions and reduce latency.

According to a first aspect, this disclosure provides a method for accessing a solid state disk, where the method is applied to a storage node, the storage node includes a network interface card and a solid state disk (SSD), the network interface card includes a memory, and the method includes:

the network interface card receives a data write request sent by a client, where the data write request includes to-be-written data;

the network interface card writes the to-be-written data to the memory of the network interface card; and the SSD obtains the to-be-written data from the memory of the network interface card, and writes the to-be-written data to the SSD.

In the method for accessing a solid state disk provided in the first aspect, the data write request sent by the client is received by the NIC, where the data write request includes the to-be-written data, the NIC writes the to-be-written data to the memory of the NIC, and the SSD obtains the to-be-written data from the memory of the NIC, and writes the to-be-written data to the SSD. Because the NIC writes the to-be-written data to the memory of the NIC, and the SSD may obtain the to-be-written data from the memory of the NIC and write the to-be-written data to the SSD, the data does not pass through a CPU and its memory, and data writing may be completed by using only one DMA. Therefore, memory consumption and memory bandwidth consumption are avoided, there are lower requirements for the configurations of the CPU and its memory, the quantity of PCIe interactions is reduced, and latency is reduced.

In a possible design, the memory of the network interface card has an I/O queue, the SSD has an NVMe I/O queue, and the data write request further includes an SSD write command; and before the SSD obtains the to-be-written data from the memory of the network interface card, the method further includes:

the network interface card writes the SSD write command to the NVMe I/O queue based on queue information of the NVMe I/O queue, and notifies the SSD of the to-be-processed SSD write command in the NVMe I/O queue.

According to the method for accessing a solid state disk provided in this implementation, because the NIC writes the to-be-written data to the memory of the NIC, writes the SSD write command to the NVMe I/O queue of the SSD, and notifies the SSD of the to-be-processed SSD write command in the NVMe I/O queue, and finally, the SSD writes the to-be-written data to the SSD from the memory of the NIC, the data does not pass through a CPU and its memory, and data writing may be completed by using only one DMA. Therefore, memory consumption and memory bandwidth consumption are avoided, there are lower requirements for the configurations of the CPU and its memory, the quantity of PCIe interactions is reduced, and latency is reduced.

In a possible design, after the to-be-written data is written to the SSD, the method further includes:

the SSD writes a write response message to the I/O queue of the network interface card based on queue information of the I/O queue, and notifies the network interface card of the write response message in the I/O queue, where the write response message is used to indicate whether the SSD write command is successfully completed; and the network interface card sends the write response message to the client.

In a possible design, the method further includes:

the network interface card receives the queue information of the NVMe I/O queue, where the queue information of the NVMe I/O queue includes a head address and a depth of the NVMe I/O queue; and the SSD receives queue information of the I/O queue, where the queue information of the I/O queue includes a head address and a depth of the I/O queue.

According to the method for accessing a solid state disk provided in this implementation, the SSD receives the queue information of the I/O queue of the NIC, the NIC receives the queue information of the NVMe I/O queue of the SSD, and after receiving the data write request subsequently, the NIC may write the SSD write command in the data write request to the NVMe I/O queue of the SSD based on the queue information of the NVMe I/O queue of the SSD. After receiving a data read request, the NIC may write a read command to the NVMe I/O queue of the SSD based on the queue information of the NVMe I/O queue of the SSD.

According to a second aspect, this disclosure provides a storage node, where the storage node includes a network interface card and a solid state disk (SSD), and the network interface card includes a memory; where the network interface card is configured to receive a data write request sent by a client, where the data write request includes to-be-written data;

the network interface card is further configured to write the to-be-written data to the memory of the network interface card; and the SSD is configured to obtain the to-be-written data from the memory of the network interface card, and write the to-be-written data to the SSD.

In a possible design, the memory of the network interface card has an I/O queue, the SSD has an NVMe I/O queue, and the data write request further includes an SSD write command; and the network interface card is further configured to write the SSD write command to the NVMe I/O queue based on queue information of the NVMe I/O queue, and notify the SSD of the to-be-processed SSD write command in the NVMe I/O queue.

In a possible design, the SSD is further configured to: after the to-be-written data is written to the SSD, write a write response message to the I/O queue of the network interface card based on queue information of the I/O queue, and notify the network interface card of the write response message in the I/O queue, where the write response message is used to indicate whether the SSD write command is successfully completed; and the network interface card is further configured to send the write response message to the client.

In a possible design, the network interface card is further configured to receive the queue information of the NVMe I/O queue, where the queue information of the NVMe I/O queue includes a head address and a depth of the NVMe I/O queue; and the SSD is further configured to receive queue information of the I/O queue, where the queue information of the I/O queue includes a head address and a depth of the I/O queue.

For beneficial effects of the storage node provided in the second aspect and the possible designs of the second aspect, refer to the beneficial effects brought by the first aspect and the possible implementations of the first aspect. Details are not described herein again.

DESCRIPTION OF EMBODIMENTS

In some embodiments of this disclosure, words such as "example" or "for example" are used to indicate examples, instances, or descriptions. Any embodiment or solution described as "example" or "for example" in the embodiments of this disclosure is not to be construed as being more preferred or advantageous than other embodiments or solutions. Exactly, use of the word "example", "for example", or the like is intended to present a relative concept in a specific manner.

In a related technology, when an SSD and a central processing unit (CPU) are not in the same chassis, a manner for accessing the SSD is as follows: A NIC first writes data to a memory (for example, a dynamic random access memory (DRAM)) of a storage node, and then a CPU of the storage node writes the data to the SSD. The CPU needs to participate in each I/O operation, and therefore, the memory and memory bandwidth of the storage node are consumed. In addition, because the data is written to the CPU from the NIC, and then the CPU writes the data to the SSD, a plurality of PCIe interactions are performed, and consequently, the quantity of PCIe interactions is relatively large, and latency is relatively high. To address this problem, this disclosure provides a method and an apparatus for accessing a solid state disk, and is applied to a storage node. The storage node includes a CPU, a memory, a NIC, and an SSD. In an initialization process, the NIC receives queue information of a non-volatile memory express (NVMe) I/O queue of the SSD, and the SSD receives queue information of an I/O queue of the NIC, so that the NIC may directly write an NVMe I/O command to the NVMe I/O queue of the SSD based on the queue information of the NVMe I/O queue. The data address in the NVMe I/O command directly uses the physical address of the memory of the NIC. Therefore, the data does not pass through the CPU and its memory, data writing can be completed by using one data transfer (for example, DMA). In this way, memory consumption and memory bandwidth consumption are avoided, there are lower requirements for the configurations of the CPU and its memory, the quantity of PCIe interactions is reduced, and latency is reduced. The following describes in detail a specific process of the method for accessing a solid state disk according to this disclosure with reference to the accompanying drawings.

Figure 1:
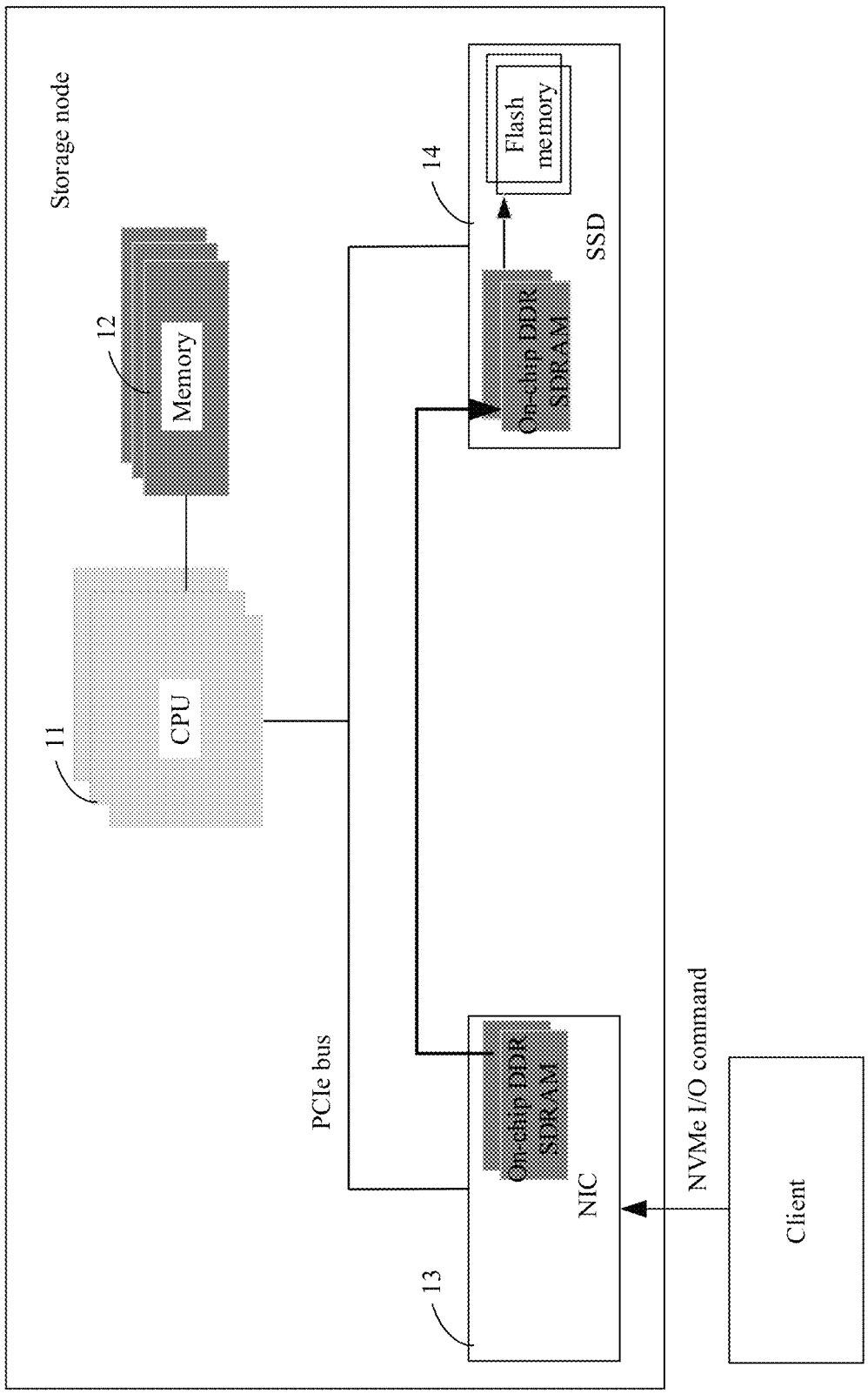
FIG. 1 is a schematic diagram of a structure of a system used in this disclosure.

FIG. 1 is a schematic diagram of a structure of a system used in this disclosure. As shown in FIG. 1, the system in this disclosure includes a client and a storage node. The client may be a host on a user side. The storage node includes a CPU 11, a memory 12, a NIC 13, and an SSD 14. The CPU 11 and the NIC 13 are connected by using a PCIe bus, the CPU 11 and the SSD 14 are also connected by using a PCIe bus, and the NIC 13 and the SSD 14 are also connected by using a PCIe bus. A memory of the NIC 13 is an on-chip double data rate synchronous dynamic random access memory (on-chip DDR SDRAM), and a memory of the SSD 14 includes an on-chip DDR SDRAM and a flash memory. As shown in FIG. 1, a method procedure for accessing a solid state disk in this disclosure is as follows: The client initiates an NVMe I/O command to the NIC 13, and the NIC 13 may directly write the NVMe I/O command to an NVMe I/O queue of the SSD based on queue information that is of the NVMe I/O queue and that is learned in an initialization process. The data address in the NVMe I/O command directly uses a physical address of the memory of the NIC. Therefore, the data does not pass through a CPU and its memory, data writing can be completed by using only one DMA. In this way, memory consumption and memory bandwidth consumption are avoided, there are lower requirements for the configurations of the CPU and its memory, the quantity of PCIe interactions is reduced, and latency is reduced. The following describes a specific process in detail with reference to the accompanying drawings.

Figure 2:
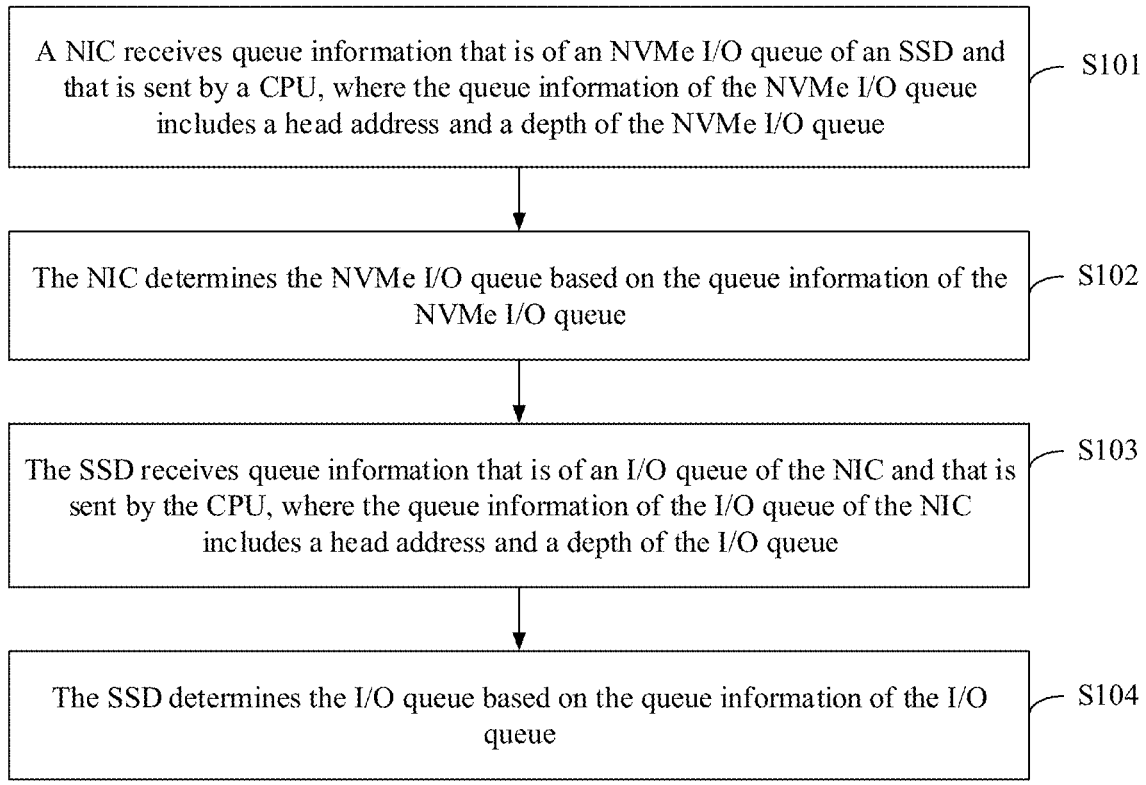
FIG. 2 is a schematic flowchart of an initialization process in a method for accessing a solid state disk according to an embodiment of this disclosure.

FIG. 2 is a schematic flowchart of an initialization process in a method for accessing a solid state disk according to an embodiment of this disclosure. As shown in FIG. 2, the method in some embodiments may include the following steps.

S101: A NIC receives queue information that is of an NVMe I/O queue of an SSD and that is sent by a CPU, where the queue information of the NVMe I/O queue includes a head address and a depth of the NVMe I/O queue.

S102: The NIC determines the NVMe I/O queue based on the queue information of the NVMe I/O queue.

Specifically, after obtaining the queue information of the NVMe I/O queue, the NIC may determine the NVMe I/O queue of the SSD. After receiving an NVMe I/O command, the NIC writes the NVMe I/O command to the NVMe I/O queue based on the head address of the NVMe I/O queue, notifies the SSD of the to-be-processed NVMe I/O command in the NVMe I/O queue, and may determine, based on the depth of the NVMe I/O queue, whether the NVMe I/O queue is full.

S103: The SSD receives queue information that is of an I/O queue of the NIC and that is sent by the CPU, where the queue information of the I/O queue of the NIC includes a head address and a depth of the I/O queue.

S104: The SSD determines the I/O queue based on the queue information of the I/O queue.

Specifically, after obtaining the queue information of the I/O queue of the NIC, the SSD may determine the I/O queue of the NIC. After receiving an I/O command, the SSD writes the I/O command to the I/O queue based on the head address of the I/O queue, notifies the NIC of the to-be-processed I/O command in the I/O queue, and may determine, based on the depth of the I/O queue, whether the I/O queue is full.

The NVMe I/O queue of the SSD is created by the CPU, and the I/O queue of the NIC is created by a remote direct memory access (RDMA) driver in the CPU. In some embodiments, through the initialization process, the SSD receives the queue information of the I/O queue of the NIC, the NIC receives the queue information of the NVMe I/O queue of the SSD, and after receiving a data write request subsequently, the NIC may write an SSD write command in the data write request to the NVMe I/O queue of the SSD based on the queue information of the NVMe I/O queue of the SSD. After receiving a data read request, the NIC may write a read command to the NVMe I/O queue of the SSD based on the queue information of the NVMe I/O queue of the SSD.

Figure 3:
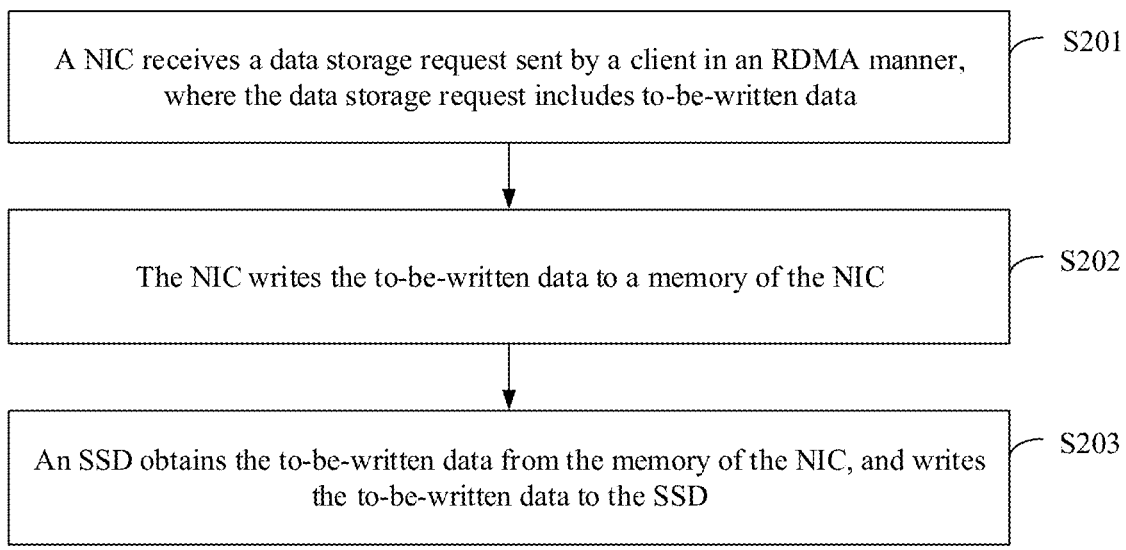
FIG. 3 is a flowchart of an embodiment of a method for accessing a solid state disk according to this disclosure.

FIG. 3 is a flowchart of an embodiment of a method for accessing a solid state disk according to this disclosure. The method in this embodiment is applied to a storage node, and the storage node includes a CPU, a memory, a NIC, and an SSD. As shown in FIG. 3, the method may include the following steps.

S201: The NIC receives a data write request sent by a client in an RDMA manner, where the data write request includes to-be-written data.

S202: The NIC writes the to-be-written data to a memory of the NIC.

S203: The SSD obtains the to-be-written data from the memory of the NIC, and writes the to-be-written data to the SSD.

Further, in some embodiments, the memory of the NIC has an I/O queue, the SSD has an NVMe I/O queue, and the data write request further includes an SSD write command. Before the SSD obtains the to-be-written data from the memory of the NIC in S203, the method may further include the following step:

S204: The NIC writes the SSD write command to the NVMe I/O queue of the SSD based on queue information of the NVMe I/O queue, and notifies the SSD of the to-be-processed SSD write command in the NVMe I/O queue.

Further, after the to-be-written data is written to the SSD in S203, the method in some embodiments may further include the following steps:

S206: The SSD writes a write response message to the I/O queue of the NIC based on queue information of the I/O queue of the NIC, and notifies the NIC of the write response message in the I/O queue, where the write response message is used to indicate whether the SSD write command is successfully completed.

S207: The NIC sends the write response message to the client.

A process of writing the data to the SSD is described above. The method in some embodiments may further include a process of reading data in the SSD. Further, the method in some embodiments may further include the following steps:

S208: The NIC receives a data read request sent by the client, where the data read request includes information about to-be-read data and an SSD read command, and the information about the to-be-read data includes namespace (NS) in which to-be-read data is located, a logical block address (LBA), and a length of the to-be-read data.

S209: The NIC writes a disk read command to the NVMe I/O queue of the SSD based on the queue information of the NVMe I/O queue, where the disk read command carries the SSD read command and the information about the to-be-read data, and the NIC notifies the SSD of the to-be-processed disk read command in the NVMe I/O queue.

S210: The SSD reads the data based on the information about the to-be-read data, and writes the read data to the memory of the NIC.

Optionally, after S210, the method in some embodiments may further include the following steps:

S211: The SSD writes a read response message to the I/O queue of the NIC based on the queue information of the I/O queue, and notifies the NIC of the read response message in the I/O queue, where the read response message is used to indicate whether the SSD read command is successfully completed.

S212: The NIC sends the read data to the client.

S213: The NIC sends I/O success state information to the client.

In the method for accessing a solid state disk provided in some embodiments, the data write request sent by the client is received by the NIC, where the data write request includes the to-be-written data, the NIC writes the to-be-written data to the memory of the NIC, and the SSD obtains the to-be-written data from the memory of the NIC, and writes the to-be-written data to the SSD. Because the NIC writes the to-be-written data to the memory of the NIC, and the SSD may obtain the to-be-written data from the memory of the NIC and write the to-be-written data to the SSD, the data does not pass through a CPU and a memory, and data writing may be completed by using only one DMA. Therefore, memory consumption and memory bandwidth consumption are avoided, there are lower requirements for the configurations of the CPU and its memory, the quantity of PCIe interactions is reduced, and latency is reduced.

Specific embodiments are used below to describe in detail the technical solutions of the method embodiment shown in FIG. 3.

Figure 4:
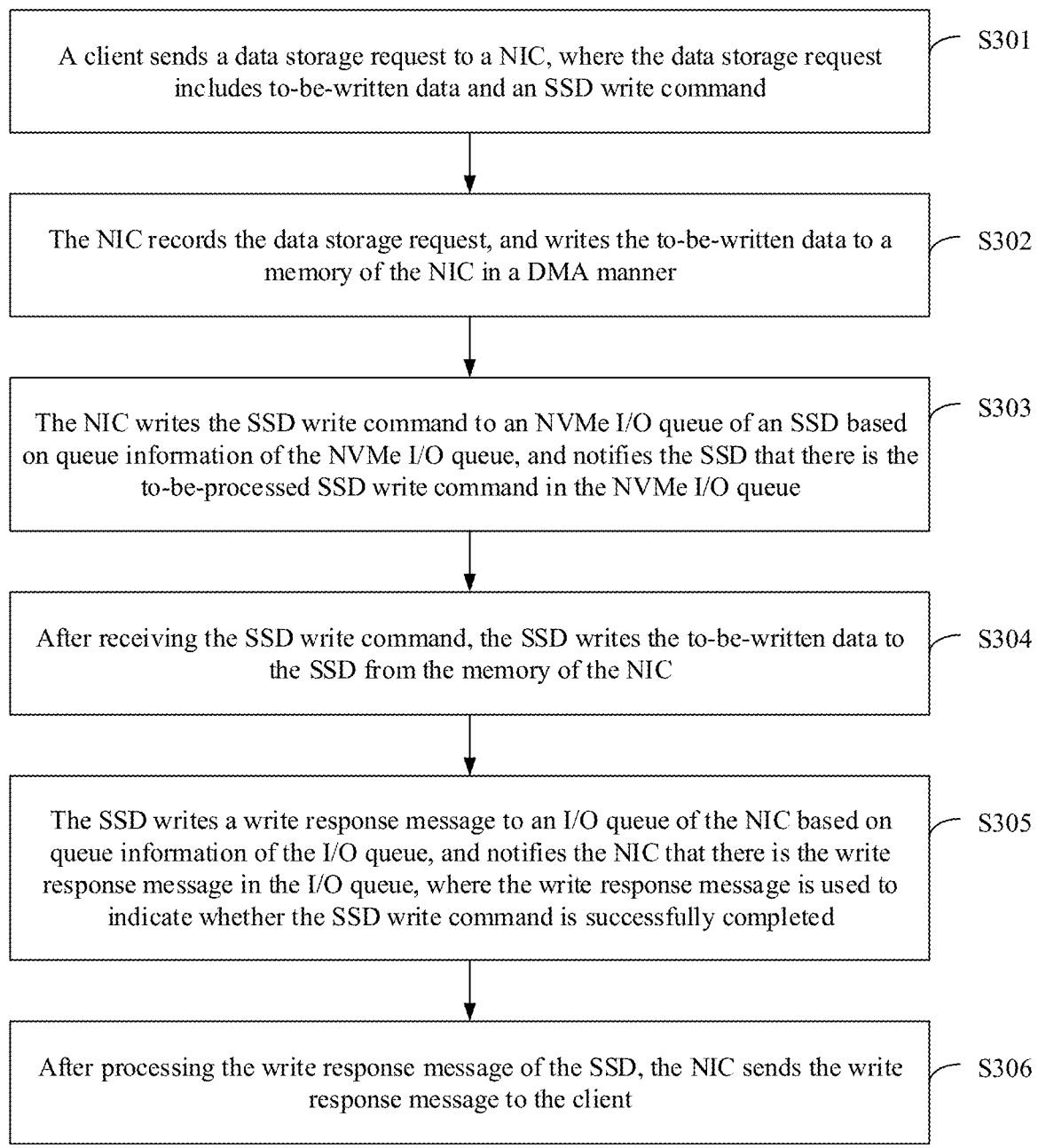
FIG. 4 is a flowchart of an embodiment of a method for accessing a solid state disk according to this disclosure.

FIG. 4 is a flowchart of an embodiment of a method for accessing a solid state disk according to this disclosure. The method in this embodiment is applied to the storage node shown in FIG. 1. As shown in FIG. 4, a data writing process is described in detail. The method may include the following steps.

S301: A client sends a data write request to a NIC, where the data write request includes to-be-written data and an SSD write command.

S302: The NIC records the data write request, and writes the to-be-written data to a memory (that is, an on-chip DDR SDRAM) of the NIC in a DMA manner.

S303: The NIC writes the SSD write command to an NVMe I/O queue of an SSD based on queue information of the NVMe I/O queue, and notifies the SSD of the to-be-processed SSD write command in the NVMe I/O queue.

Specifically, an engine of the NIC may ring a doorbell of the NVMe I/O queue of the SSD to notify the SSD of the to-be-processed SSD write command in the I/O queue.

S304: After receiving the SSD write command, the SSD writes the to-be-written data to the SSD from the memory of the NIC.

S305: The SSD writes a write response message to an I/O queue of the NIC based on queue information of the I/O queue, and notifies the NIC of the write response message in the I/O queue, where the write response message is used to indicate whether the SSD write command is successfully completed.

Specifically, the write response message is written to the I/O queue of the NIC, and the NIC does not know that a doorbell of the I/O queue on a NIC side needs to be ringed to indicate the NIC to process the data returned by the SSD to the NIC.

S306: After processing the write response message of the SSD, the NIC sends the write response message to the client.

In some embodiments, after the NIC receives the data write request sent by the client, because the NIC writes the to-be-written data to the memory of the NIC, writes the SSD write command to the NVMe I/O queue of the SSD, and notifies the SSD of the to-be-processed SSD write command in the NVMe I/O queue, and finally, the SSD writes to-be-written data to the SSD from the memory of the NIC, the data does not pass through a CPU and a memory, and data writing may be completed by using only one DMA. Therefore, memory consumption and memory bandwidth consumption are avoided, there are lower requirements for the configurations of the CPU and its memory, the quantity of PCIe interactions is reduced, and latency is reduced.

Figure 5:
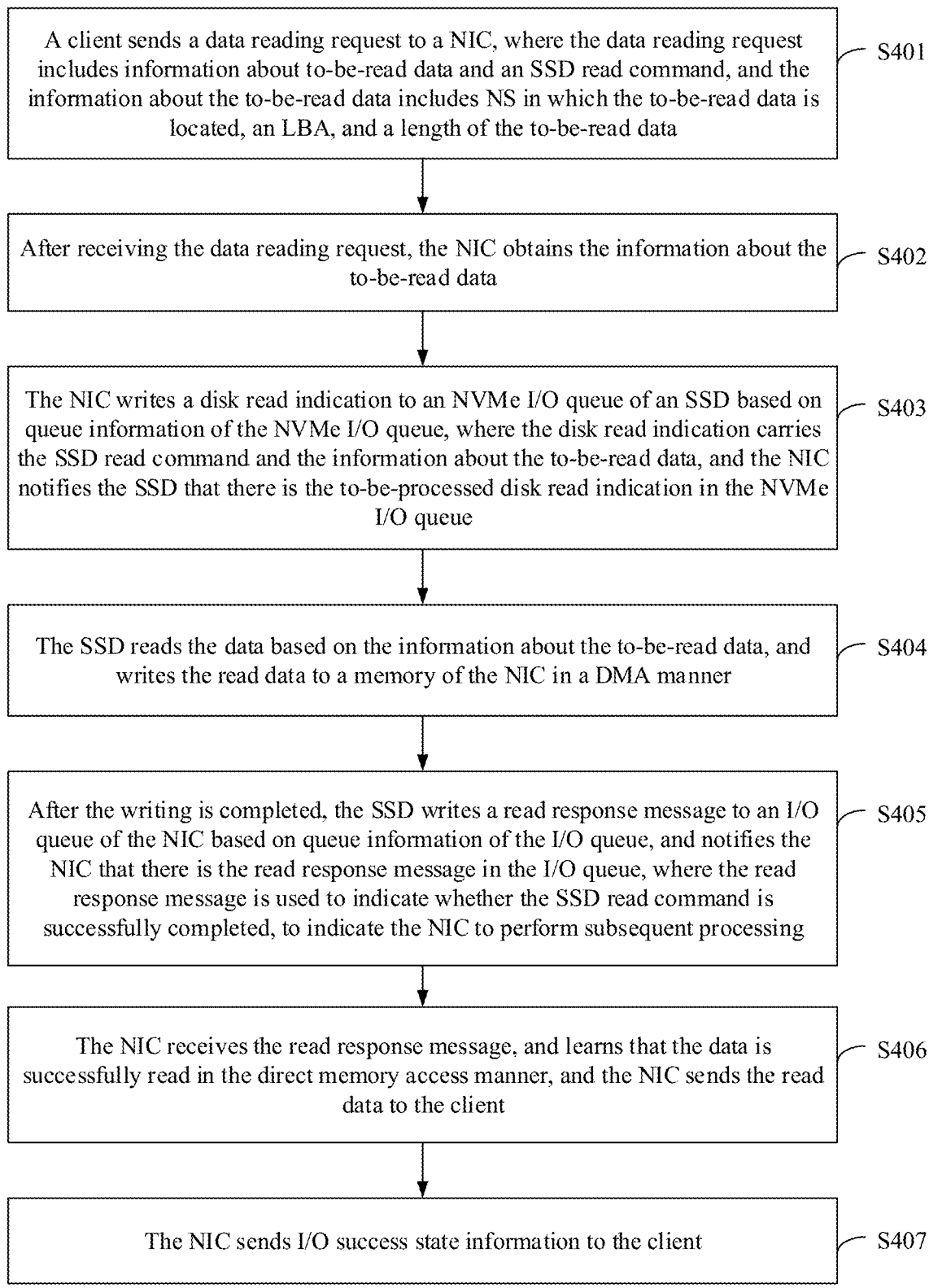
FIG. 5 is a flowchart of an embodiment of a method for accessing a solid state disk according to this disclosure.

FIG. 5 is a flowchart of an embodiment of a method for accessing a solid state disk according to this disclosure. The method in this embodiment is applied to the storage node shown in FIG. 1. As shown in FIG. 5, a data read process is described in detail. The method may include the following steps.

S401: A client sends a data read request to a NIC, where the data read request includes information about to-be-read data and an SSD read command, and the information about the to-be-read data includes NS in which the to-be-read data is located, an LBA, and a length of the to-be-read data.

S402: After receiving the data read request, the NIC obtains the information about the to-be-read data.

S403: The NIC writes a disk read command to an NVMe I/O queue of an SSD based on queue information of the NVMe I/O queue, where the disk read command carries the SSD read command and the information about the to-be-read data, and the NIC notifies the SSD of the to-be-processed disk read command in the NVMe I/O queue.

S404: The SSD reads the data based on the information about the to-be-read data, and writes the read data to a memory of the NIC in a DMA manner.

S405: After the writing is completed, the SSD writes a read response message to an I/O queue of the NIC based on queue information of the I/O queue, and notifies the NIC of the read response message in the I/O queue, where the read response message is used to indicate whether the SSD read command is successfully completed, to indicate the NIC to perform subsequent processing.

S406: The NIC receives the read response message, and learns that the data is successfully read in the DMA manner, and the NIC sends the read data to the client.

S407: The NIC sends I/O success state information to the client.

Figure 6:
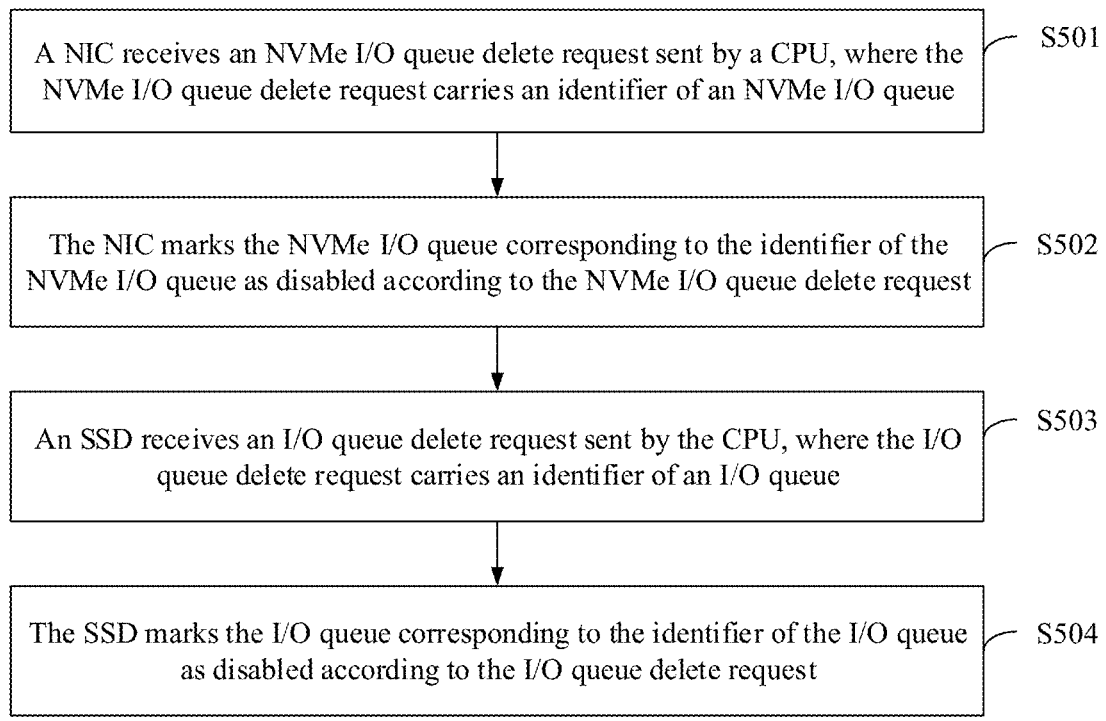
FIG. 6 is a schematic diagram of a queue deletion process.

FIG. 6 is a schematic diagram of a queue deletion process. As shown in FIG. 6, the method in this embodiment may include the following steps.

S501: A NIC receives an NVMe I/O queue delete request sent by a CPU, where the NVMe I/O queue delete request carries an identifier of an NVMe I/O queue.

S502: The NIC marks the NVMe I/O queue corresponding to the identifier of the NVMe I/O queue as disabled according to the NVMe I/O queue delete request.

Specifically, when the CPU deletes the NVMe I/O queue, the CPU obtains the identifier of the NVMe I/O queue, and sends the NVMe I/O queue delete request to the NIC, where the NVMe I/O queue delete request carries the identifier of the NVMe I/O queue; and the NIC marks the NVMe I/O queue corresponding to the identifier of the NVMe I/O queue as disabled, indicating that the NVMe I/O queue is no longer used for data transmission subsequently, until the NVMe I/O queue is created again.

In some embodiments, the CPU may send the NVMe I/O queue delete request to the NIC when a network fault, a NIC fault, or a disk fault occurs.

S503: An SSD receives an I/O queue delete request sent by the CPU, where the I/O queue delete request carries an identifier of an I/O queue.

S504: The SSD marks the I/O queue corresponding to the identifier of the I/O queue as disabled according to the I/O queue delete request.

Similarly, the CPU sends the I/O queue delete request to the SSD, where the I/O queue delete request carries the identifier of the I/O queue, and the SSD marks the I/O queue corresponding to the identifier of the I/O queue as disabled according to the I/O queue delete request, indicating that the I/O queue is no longer used for data transmission subsequently.

In some embodiments, the CPU may send the I/O queue delete request to the SSD when a network fault, an SSD fault, or a disk fault occurs.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this disclosure are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for accessing a solid state disk (SSD) in a storage node, the storage node comprises a network interface card and the SSD, the network interface card comprises a memory, the SSD comprises an I/O queue, and the method comprises:
   receiving, by the network interface card, a data write request sent by a client, wherein the data write request comprises to-be-written data and an SSD write command;
   writing, by the network interface card, the to-be-written data to the memory of the network interface card;
   writing, by the network interface card, the SSD write command into the I/O queue comprised in the SSD; and
   obtaining, by the SSD, the to-be-written data directly from the memory of the network interface card, and storing the to-be-written data on the SSD.

2. The method according to claim 1, wherein the memory of the network interface card has an I/O queue, the I/O queue comprised in the SSD comprises an NVMe I/O queue, and the writing of the SSD write command into the I/O queue of the SSD by the network interface card comprises:
   writing, by the network interface card, the SSD write command to the NVMe I/O queue based on queue information of the NVMe I/O queue, and notifying the SSD of the SSD write command to be processed in the NVMe I/O queue.

3. The method according to claim 2, wherein after the writing the to-be-written data to the SSD, the method further comprises:
   writing, by the SSD, a write response message to the I/O queue of the network interface card based on queue information of the I/O queue, and notifying the network interface card of the write response message in the I/O queue, wherein the write response message indicates whether the SSD write command is successfully completed; and
   sending, by the network interface card, the write response message to the client.

4. The method according to claim 2, wherein the method further comprises:
   receiving, by the network interface card, the queue information of the NVMe I/O queue, wherein the queue information of the NVMe I/O queue comprises a head address and a depth of the NVMe I/O queue; and
   receiving, by the SSD, queue information of the I/O queue, wherein the queue information of the I/O queue comprises a head address and a depth of the I/O queue.

5. A storage node, wherein the storage node comprises a network interface card and a solid state disk (SSD), and the network interface card comprises a memory, the SSD comprises an I/O queue, wherein
   the network interface card is configured to receive a data write request sent by a client, wherein the data write request comprises to-be-written data and an SSD write command;
   the network interface card is further configured to write the to-be-written data to the memory of the network interface card and write the SSD write command into the I/O queue comprised in the SSD; and
   the SSD is configured to obtain the to-be-written data directly from the memory of the network interface card, and store the to-be-written data to the SSD.

6. The storage node according to claim 5, wherein the memory of the network interface card has an I/O queue, the I/O queue comprised in the SSD comprises an NVMe I/O queue; and
   the network interface card is further configured to write the SSD write command to the NVMe I/O queue based on queue information of the NVMe I/O queue, and notify the SSD of the SSD write command to be processed in the NVMe I/O queue.

7. The storage node according to claim 6, wherein
   the SSD is further configured to: after the to-be-written data is written to the SSD, write a write response message to the I/O queue of the network interface card based on queue information of the I/O queue, and notify the network interface card of the write response message in the I/O queue, wherein the write response message indicates whether the SSD write command is successfully completed; and
   the network interface card is further configured to send the write response message to the client.

8. The storage node according to claim 6, wherein
   the network interface card is further configured to receive the queue information of the NVMe I/O queue, wherein the queue information of the NVMe I/O queue comprises a head address and a depth of the NVMe I/O queue; and
   the SSD is further configured to receive queue information of the I/O queue, wherein the queue information of the I/O queue comprises a head address and a depth of the I/O queue.

* * * * *